US012533885B2

(12) United States Patent
Satoh

(10) Patent No.: US 12,533,885 B2
(45) Date of Patent: Jan. 27, 2026

(54) MAINTENANCE DEVICE AND PRINTER

(71) Applicant: Kaoru Satoh, Nagano (JP)

(72) Inventor: Kaoru Satoh, Nagano (JP)

(73) Assignee: Ricoh Company, Ltd., Tokyo (JP)

( * ) Notice: Subject to any disclaimer, the term of this patent is extended or adjusted under 35 U.S.C. 154(b) by 8 days.

(21) Appl. No.: 18/458,379

(22) Filed: Aug. 30, 2023

(65) Prior Publication Data

US 2024/0109322 A1 Apr. 4, 2024

(30) Foreign Application Priority Data

Sep. 30, 2022 (JP) ................................ 2022-158567

(51) Int. Cl.
*B41J 2/165* (2006.01)

(52) U.S. Cl.
CPC .......... *B41J 2/165* (2013.01); *B41J 2/16502* (2024.05); *B41J 2/16508* (2013.01); *B41J 2/16517* (2013.01); *B41J 2/16523* (2013.01); *B41J 2/16552* (2013.01)

(58) Field of Classification Search
CPC .... B41J 2/165; B41J 2/16502; B41J 2/16505; B41J 2/16517; B41J 2/16523; B41J 2/16552
See application file for complete search history.

(56) References Cited

U.S. PATENT DOCUMENTS

| | | | | |
|---|---|---|---|---|
| 9,096,066 | B2 * | 8/2015 | Kamiyama | .......... B41J 2/16505 |
| 2012/0229541 | A1 | 9/2012 | Satoh et al. | |
| 2013/0027474 | A1 | 1/2013 | Satoh | |

FOREIGN PATENT DOCUMENTS

| | | | |
|---|---|---|---|
| JP | 2010120266 | A | 6/2010 |
| JP | 2020168798 | A | 10/2020 |

* cited by examiner

*Primary Examiner* — Geoffrey S Mruk
(74) *Attorney, Agent, or Firm* — Harness, Dickey & Pierce, P.L.C.

(57) ABSTRACT

A maintenance device includes: a cap detachably contactable with a nozzle face of a liquid discharge head; a suction device to suck liquid from the cap; a waste liquid storage to store the liquid sucked from the cap by the suction device; a waste liquid channel connecting the cap and the waste liquid storage; a cleaning liquid storage storing a cleaning liquid to be supplied to the cap; and a cleaning liquid channel connecting the cap and the cleaning liquid storage. The suction device sucks: the waste liquid in the cap to discharge the waste liquid to the waste liquid storage through the waste liquid channel; and the cleaning liquid in the cleaning liquid storage to supply the cleaning liquid to the cap through the cleaning liquid channel.

7 Claims, 5 Drawing Sheets

FIG. 4 COMPARATIVE EXAMPLE

MAINTENANCE DEVICE AND PRINTER

CROSS-REFERENCE TO RELATED APPLICATIONS

This patent application is based on and claims priority pursuant to 35 U.S.C. § 119(a) to Japanese Patent Application No. 2022-158567, filed on Sep. 30, 2022, in the Japan Patent Office, the entire disclosure of which is hereby incorporated by reference herein.

BACKGROUND

Technical Field

Embodiments of the present disclosure relate to a maintenance device and a printer.

Related Art

In typical printers such as inkjet printers, the techniques for sucking ink from a nozzle face of a liquid discharge head using a cap and a pump are well-known. One of the purposes is to suck ink from the nozzle surface, maintaining a clean nozzle of the liquid discharge head.

Such an operation of sucking ink from the nozzle face is one of the maintenance mechanisms. The maintenance mechanisms involve, for example, discharging the sucked ink to a waste liquid tank and supplying a cleaning liquid to a cap in contact with the liquid discharge head.

SUMMARY

An embodiment of the present disclosure provides a maintenance device including: a cap detachably contactable with a nozzle face of a liquid discharge head; a suction device to suck liquid from the cap; a waste liquid storage to store the liquid sucked from the cap by the suction device; a waste liquid channel connecting the cap and the waste liquid storage; a cleaning liquid storage storing a cleaning liquid to be supplied to the cap; and a cleaning liquid channel connecting the cap and the cleaning liquid storage. The suction device sucks: the waste liquid in the cap to discharge the waste liquid to the waste liquid storage through the waste liquid channel; and the cleaning liquid in the cleaning liquid storage to supply the cleaning liquid to the cap through the cleaning liquid channel.

An embodiment of the present disclosure provides a printer including: the maintenance device as described above; and the liquid discharge head to discharge a liquid to a recording medium.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 4 is a schematic view of a maintenance device according to a comparative example which is not included in embodiments of the present disclosure.

Figure 1:
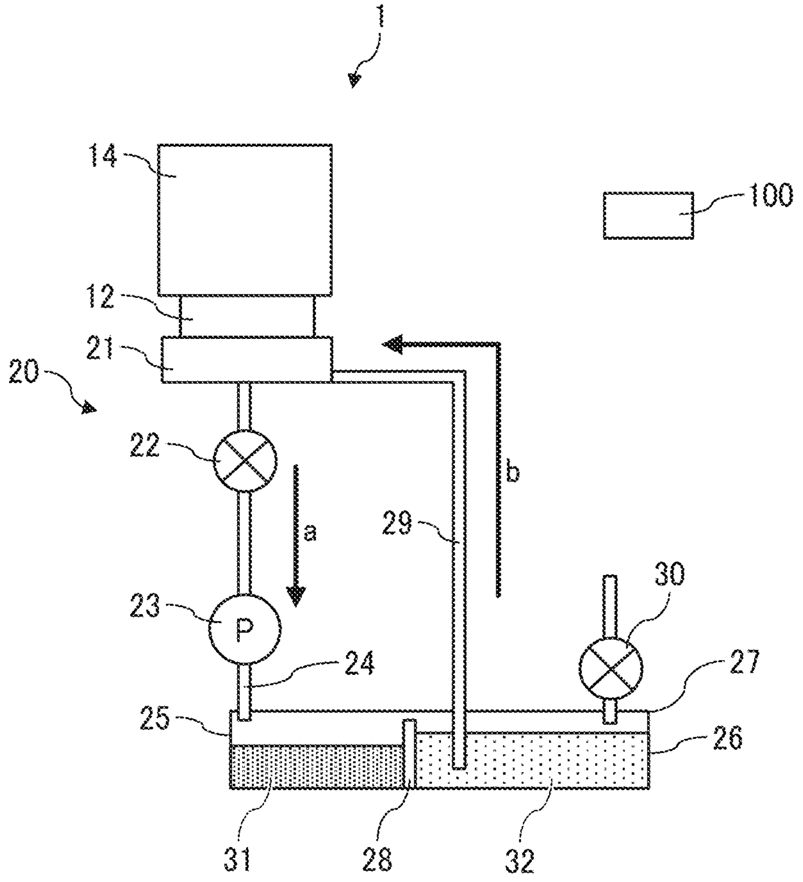
FIG. 1 is a schematic view of a maintenance device and a printer according to an embodiment of the present disclosure.

The accompanying drawings are intended to depict embodiments of the present invention and should not be interpreted to limit the scope thereof. The accompanying drawings are not to be considered as drawn to scale unless explicitly noted. Also, identical or similar reference numerals designate identical or similar components throughout the several views.

DETAILED DESCRIPTION

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Referring now to the drawings, embodiments of the present disclosure are described below. As used herein, the singular forms “a,” “an,” and “the” are intended to include the plural forms as well, unless the context clearly indicates otherwise.

Embodiments of the present disclosure provide a maintenance device with a simple configuration that supplies a cleaning liquid to a cap and prevents clogging of the cap or a waste liquid channel due to fixation of an ink component.

Hereinafter, a maintenance device and a printing apparatus according to the present invention will be described with reference to the drawings. Note that the following embodiments are not limiting the present disclosure and any deletion, addition, modification, change, etc. can be made within a scope in which a person skilled in the art can conceive including other embodiments and any of which is included within the scope of the present disclosure as long as the effect and feature of the present disclosure are demonstrated.

The maintenance device includes: a cap to contact a nozzle face of a liquid discharge head; a suction device to suck liquid from the cap; a waste liquid storage to which the liquid sucked from the cap is discharged; a waste liquid channel connecting the cap and the waste liquid storage; a cleaning liquid storage accommodating a cleaning liquid; a cleaning liquid feed channel connecting the cap and the cleaning liquid storage; and a partition separating the liquid in the waste liquid channel from the cleaning liquid in the cleaning liquid storage to prevent the liquid in the waste liquid storage from mixing with the cleaning liquid in the cleaning liquid storage.

The waste liquid storage communicates with the cleaning liquid storage so as to allow gases in the waste liquid storage and the cleaning liquid storage to flow therebetween.

The cleaning liquid is supplied from the cleaning liquid storage to the cap through the cleaning liquid feed channel by increased pressures within the waste liquid storage and the cleaning liquid storage in response to suction of the suction device.

A printer according to an embodiment of the present disclosure includes a liquid discharge head to discharge liquid to a recording medium, and a maintenance device according to an embodiment of the present disclosure. The printer may be referred to as a device that discharges liquid, an image forming apparatus, a recording device, or inkjet printer. The recording medium is not limited to particular materials and may be any appropriately selected. The recording medium may be referred to as a print medium, for example.

Embodiments of the present disclosure supplies a cleaning liquid to a cap with a simple configuration and prevents clogging of the cap or a waste liquid channel due to fixation of an ink component.

A comparative example of a maintenance device is described below with reference to FIG. 4.

FIG. 4 is a schematic view of a maintenance device according to a comparative example. In FIG. 4, a cap 21 is in contact with the nozzle face of the liquid discharge head 12, and suction is performed by a suction pump 23. The liquid (for example, ink) sucked by the cap 21 is discharged to a waste liquid tank 25 through a waste liquid channel 24. Such suction of ink recovers the nozzle condition.

However, through repeating such suction many times, the ink may adhere to the inside of the cap 21 (the inner space formed by the nozzle face and the cap 21) or the inside of the waste liquid channel 24. If the ink is fixed, a failure might occur in the suction operation, and the nozzle condition might not be recovered. In such a case, the discharge performance of the liquid discharge head 12 decreases, leading to a decline in image quality.

In another comparative example, the technique for supplying a cleaning liquid to a cap is proposed. However, the technique according to another comparative example faces a challenge in supplying a cleaning liquid to the cap with a simple configuration, and in preventing clogging of the cap or waste liquid channel due to the fixation of ink components.

FIG. 1 is a schematic view of a maintenance device 20 and a printer 1 according to an embodiment of the present disclosure.

The printer 1 includes, for example, a liquid discharge head 12 and the maintenance device 20.

The liquid discharge head 12 is supplied with liquid (for example, ink) from an ink tank 14 and discharges the liquid onto the recording medium. The liquid discharge head is not limited to a particular type, and may be of a serial type or a line type. In some embodiments, multiple liquid discharge heads are used. Alternatively, a head array or a head unit may be configured.

The maintenance device 20 includes, for example, a cap 21, a suction pump 23, a waste liquid tank 25, and a cleaning liquid tank 26.

The cap 21 is contactable with the nozzle face of the liquid discharge head 12.

The suction pump 23 serves as a suction device to suck liquid from the cap 21.

The waste liquid tank 25 serves as a waste liquid storage to discharge the liquid sucked from the cap 21. In the drawing, the sucked liquid is illustrated as a waste liquid 31.

The cleaning liquid tank 26 serves as a cleaning liquid storage to store the cleaning liquid 32.

The maintenance device 20 also includes a waste liquid channel 24 and a cleaning liquid feed channel 29.

The waste liquid channel 24 connects the cap 21 with the waste liquid tank 25. The cleaning liquid feed channel 29 connects the cap 21 with the cleaning liquid tank 26. The waste liquid channel 24 and the cleaning liquid feed channel 29 are not limited to any particular shape or structure, but can be formed, for example, by a tube.

The cap 21 includes, for example, a first connection port to which the waste liquid path 24 is connected and a second connection port to which the cleaning liquid feed channel 29 is connected. The positions of the first connection port and the second connection port are not limited to particular positions and may be changed as appropriate.

In the present embodiment, the waste liquid tank 25 and the cleaning liquid tank 26 are connected to each other to allow the gases inside to flow between the waste liquid tank 25 and the cleaning liquid tank 26. Further, A partition 28 is provided to prevent the liquid in the waste liquid tank 25 from mixing with the cleaning liquid in the cleaning liquid tank 26. The phrase "the waste liquid tank 25 and the cleaning liquid tank 26 are connected to each other to allow the gases inside flow between the waste liquid tank 25 and the cleaning liquid tank 26" may be expressed as "the waste liquid tank 25 and the cleaning liquid tank 26 are internally connected".

This configuration allows for the automatic supply of a cleaning liquid 32 to cap 21. For example, when suction is performed with cap 21 contacting the nozzle face, the internal pressure in the waste liquid tank 25 and the cleaning liquid tank 26 rises, forcing the cleaning liquid 32 in the cleaning liquid tank 26 into the cleaning liquid feed channel 29.

Concurrently with the suction, the cleaning liquid 32 is automatically supplied to the cap 21 through the cleaning liquid feed channel 29.

The configuration according to the present embodiment enables the supply of the cleaning liquid to the cap 21 without using a channel switching mechanism and without complicating the device. Further, the configuration according to the present embodiment allows the cleaning liquid supplied to the cap without passing through the waste liquid channel 24, thus enabling the cleaning liquid without containing an ink component to be supplied to the cap 21.

This prevents the cleaning liquid from being dried and the ink component from being fixed to, for example, the waste liquid channel 24, thus preventing the clogging of the channel.

The present embodiment allows the cleaning liquid 32 to be automatically fed to and through the cap 21 and the waste liquid channel 24 concurrently with the suction of the ink. This enables the ink remaining in the cap 21 and the waste liquid channel 24 to be washed away.

By washing away the ink remaining in cap 21 and the waste liquid channel 24, the ink can be prevented from adhering or being fixed to the cap 21 and the waste liquid channel 24, thus preventing a decrease in the functionality of the maintenance mechanisms due to ink adhesion or fixation. The present embodiment enables cleaning of the maintenance mechanism used to maintain and recover the discharging condition of the liquid discharge head 12, using a simple configuration.

When performing the suction from the cap 21 and the supply of the cleaning liquid to the cap 21, the cap 21 may be in contact with the nozzle face or may not be in contact with the nozzle face. The suction with the cap 21 contacting the nozzle face allows cleaning of the nozzle face of the liquid discharge head 12.

The suction with cap 21 not contacting the nozzle face causes the cap 21 to draw in air. Such a case also raises the internal pressure of the waste liquid tank 25 and the cleaning liquid tank 26, allowing the cleaning liquid 32 to be supplied to the cap 21.

The amount of the cleaning liquid 32 to be supplied is appropriately determined, for example, by the capacities of the waste liquid tank 25 and the cleaning liquid tank 26 or the amount of the liquid in the waste liquid tank 25.

Further, since the change in the pressure inside the waste liquid tank 25 might be affected by the amount of liquid (i.e., waste liquid) discharged to the waste liquid tank 25, the amount of the waste liquid in the waste liquid tank 25 is preferably considered for designing.

In the present embodiment, the cap 21 is pressed against the nozzle face of the liquid discharge head 12 to contact the nozzle face. The cap 21 being pressed against the nozzle face facilitates the formation of a sealed space between the cap 21 and the nozzle face. A pressing method is not limited to a particular method. In some embodiments, a biasing member is used.

Preferably, the cap 21 is pressed against the nozzle face of the liquid discharge head 12 to be sealed to the nozzle face. This enhances the suction efficiency.

In the present embodiment, the waste liquid channel 24 includes a valve 22. When the valve 22 is opened, the waste liquid is discharged from the cap 21 to the waste liquid tank 25. When the valve 22 is closed, the waste liquid fails to be drained from the cap 21 to the waste liquid tank 25. The phrase "the waste liquid is drained to the waste liquid tank 25 through the waste liquid channel 24" may be rephrased also as the waste liquid is discharged, supplied, or introduced to the waste liquid tank 25 through the waste liquid channel 24. Incorporating the valve 22 expands options for maintenance operations.

The maintenance device according to the present embodiment includes a liquid storage tank 27.

The liquid storage tank 27 serves as a liquid storage that includes the waste liquid tank 25 (i.e., the waste liquid storage) and the cleaning liquid tank 26 (i.e., the cleaning liquid storage).

The liquid storage tank 27 is connected to the waste liquid channel 24 and the cleaning liquid feed channel 29. The liquid storage tank 27 includes an air release valve 30 that opens and closes the communication with the atmosphere outside the maintenance device 20.

Incorporating the air release valve 30 expands options for maintenance operations. For example, maintaining the air release valve 30 open prevents the cleaning liquid 32 from being supplied to the cap 21 during suction.

Maintaining the air release valve 30 closed allows the cleaning liquid 32 to be supplied to the cap 21 during suction.

This enables whether or not to clean the cap 21 and the waste liquid channel 24 to be determined. Performing the suction and supply of the cleaning liquid simultaneously enables the cleaning of the cap 21 and the waste liquid channel 24. Whether or not to perform such cleaning can be determined by opening and closing the air release valve 30.

The air release valve 30 serves as an air release portion that opens and closes the communication with the atmosphere outside the maintenance device 20. When the air release valve 30 is opened (in an open state), the liquid storage tank 27 communicates with the atmosphere outside the maintenance device 20. When the air release valve 30 is closed (in a closed state), the liquid storage tank 27 does not communicate with the atmosphere.

The liquid storage tank 27 according to the present embodiment of the present example includes, for example, one casing or a housing. In the liquid storage tank 27, the waste liquid storage and the cleaning liquid storage are divided by the partition 28.

The following describes the operation of the maintenance device 20 according to an embodiment of the present disclosure. In the following described operation according to an embodiment of the present disclosure, the air release valve 30 is used. The air release valve 30 can be of any configuration.

(1) Cleaning of Liquid Discharge Head

The cap 21 is brought into contact with the nozzle face of the liquid discharge head 12. Suction is performed by the suction pump 23 with the valve 22 kept open. This draws liquid from the cap 21, creating negative pressure inside the cap 21, and results in suction being applied to the nozzle face of the liquid discharge head 12. Thus, the liquid is drained from the cap 21 through the waste liquid channel 24, following the direction of arrow a as illustrated in FIGS. 1 to 2C to the waste liquid tank 25. By doing so, for example, liquid adhering to the nozzle face of the liquid discharge head 12 can be cleaned off.

The inside of the cap 21 refers to a space between the nozzle face of the liquid discharge head 12 and the cap 21.

(2) Cleaning of Cap and Waste Liquid Channel

In the present embodiment, when the suction described in section (1) above is performed, the internal pressures of the waste liquid tank 25 and the cleaning liquid tank 26 increase. Thus, the cleaning liquid 32 in the cleaning liquid tank 26 is pushed out and flows through the cleaning liquid feed channel 29 in the direction arrow b, resulting in the supply of the cleaning liquid 32 to the cap 21. In other words, concurrently with the suction described in section (1) above, the cleaning liquid 32 can be automatically supplied to the cap 21.

By supplying the cleaning liquid 32 to the cap 21 concurrently with suction, liquid (e.g., ink) remaining in the cap 21 and the waste liquid channel 24 can be washed away. In such a manner, the cap 21 and the waste liquid channel 24 can be cleaned. By washing away the ink remaining in the cap 21 and the waste liquid channel 24, adherence or fixation of ink to the inside surfaces of both the cap 21 and the waste liquid channel 24 can be prevented. This enables the maintenance device to maintain its maintenance function.

The present embodiment allows the cleaning liquid 32 to be automatically supplied to the cap 21 concurrently with the suction described in section (1). This eliminates the use of a liquid feed pump for supplying the cleaning liquid 32. This configuration prevents the structure and control processing of the device from becoming more complex for supplying the cleaning liquid 32 and also enables the device to be miniaturized.

The operations described in sections (1) and (2) above are illustrated in FIG. 1. The liquid (for example, ink) is discharged from the cap 21 to the waste liquid tank 25 in the direction indicated by arrow a, and the cleaning liquid 32 is supplied from the cleaning liquid tank 26 to the cap 21 in the direction indicated by arrow b.

(3) Suction without Supplying Cleaning Liquid

In section (2) above, the cleaning liquid 32 is automatically supplied to the cap 21 concurrently with the suction described in section (1) above. However, the cleaning liquid 32 may be prevented from being supplied.

When performing the suction described in section (1) above, the suction pump 23 performs suction with the air release valve 30 maintained open. This allows the pressure inside the liquid storage tank 27 to be maintained equal to atmospheric pressure, enabling only suction to be performed without feeding the cleaning liquid 32.

Figure 2A:
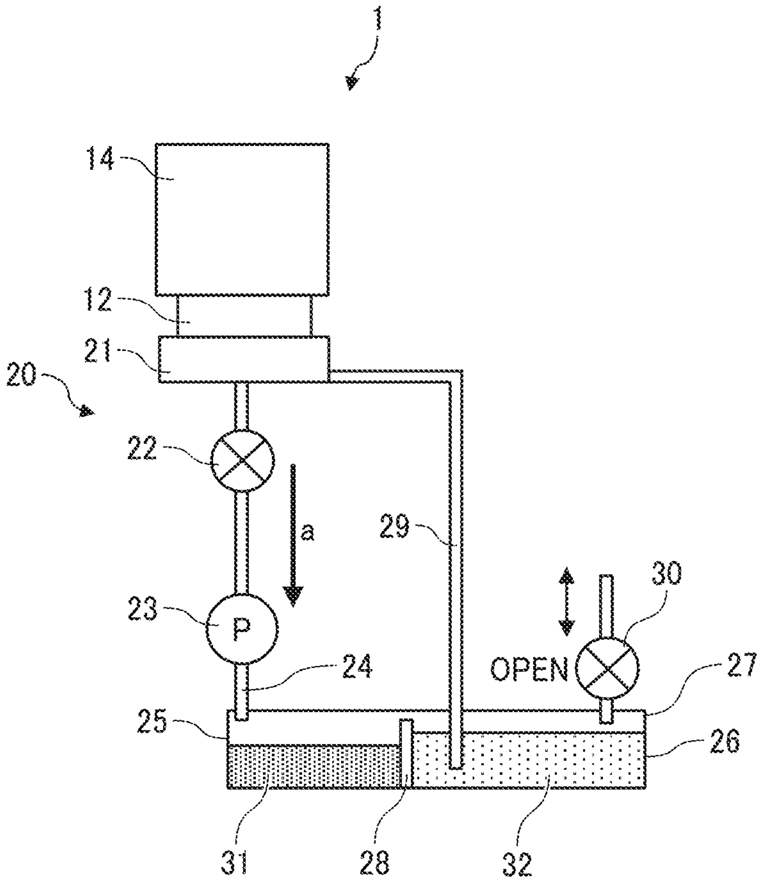
FIG. 2A is a schematic view of a maintenance operation according to an embodiment of the present disclosure.

The operation described in section (3) above is illustrated in FIG. 2A. The liquid is discharged from the cap 21 to the waste liquid tank 25 in the direction indicated by arrow a, but the cleaning liquid 32 is not supplied to the cap 21.

(4) Supply of Cleaning Liquid to Cap

The cleaning liquid 32 can be supplied to the cap 21 without performing suction on the nozzle face of the liquid discharge head 12. In this case, suction is performed by the suction pump 23 with the air release valve 30 closed and the valve 22 opened, without allowing the cap 21 to contact the liquid discharge head 12.

This causes the cap 21 to draw in air, increasing the pressure in the liquid storage tank 27, and leading to the supply of the cleaning liquid 32 to the cap 21 through the cleaning liquid feed channel 29.

In this condition, if the suction of the suction pump 23 continues, the cleaning liquid 32 supplied to the cap 21 is drained through the waste liquid channel 24. To avoid this, the suction of the suction pump 23 is stopped at an appropriate timing. This allows the cap 21 to be filled with the cleaning liquid 32.

Figure 2B:
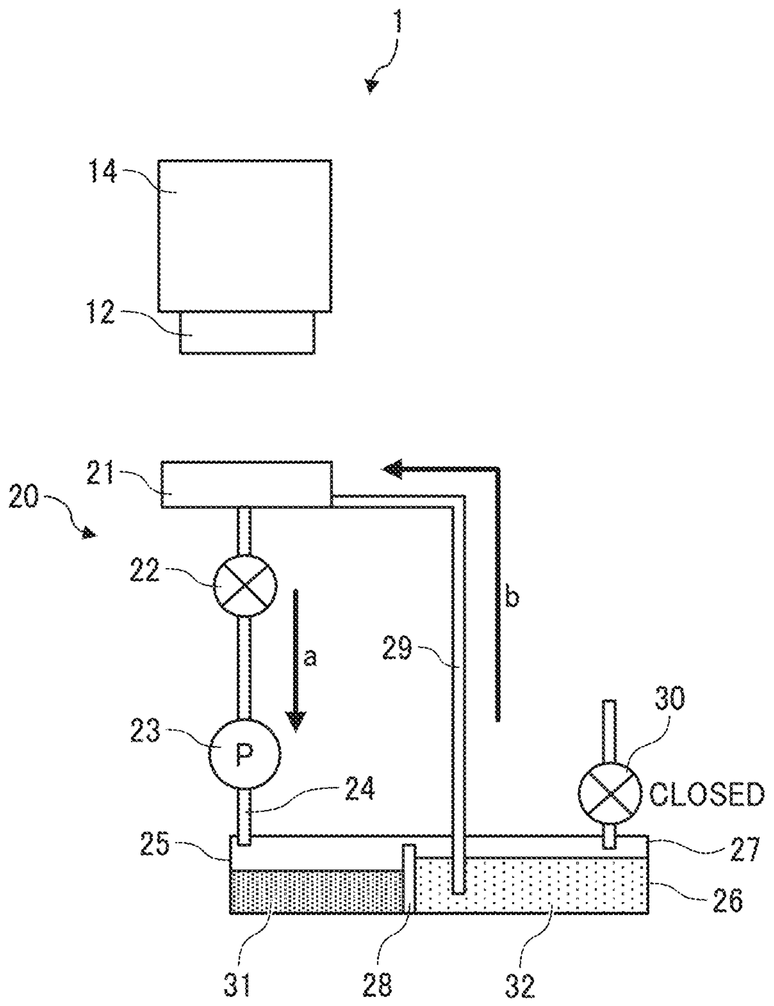
FIG. 2B is a schematic view of the maintenance operation according to an embodiment of the present disclosure.
Figure 2C:
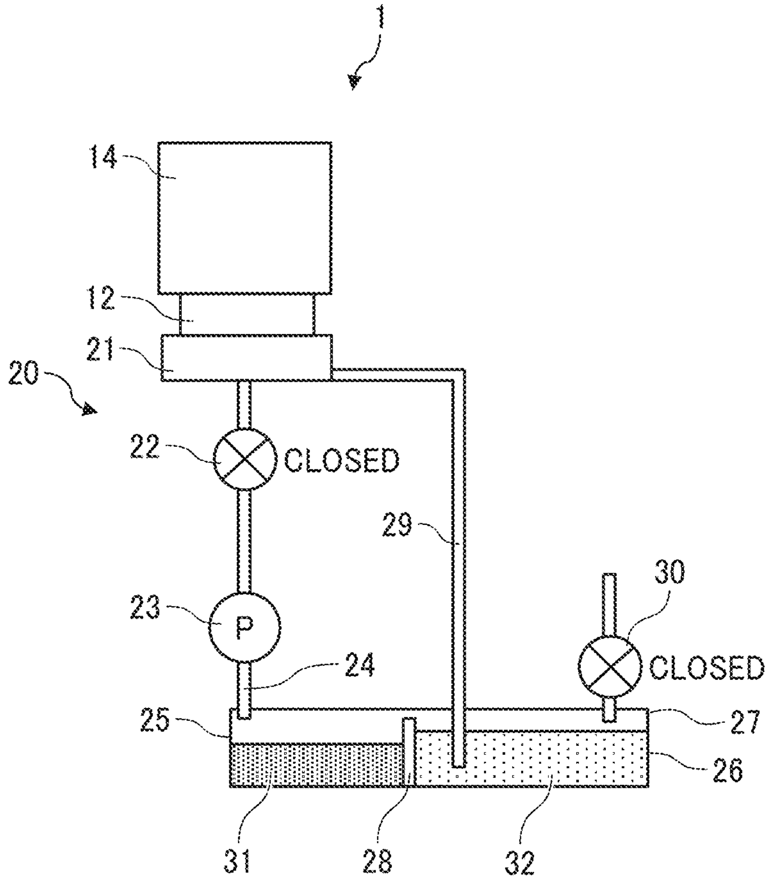
FIG. 2C is a schematic view of the maintenance operation according to an embodiment of the present disclosure.

The operation described in section (4) above is illustrated in FIG. 2B. The cap 21 is separated from the liquid discharge head 12, and air is drawn out of the cap 21 in the direction indicated by arrow a.

This raises the internal pressure of the waste liquid tank 25 and the cleaning liquid tank 26, allowing the supply of the cleaning liquid 32 to the cap 21 in the direction indicated by arrow b.

(5) Capping (Cap Operation)

The cap 21 is brought into contact with the nozzle face of the liquid discharge head 12, with the cleaning liquid 32 remaining in the cap 21. This allows capping with the interior of the cap 21 maintained moist, preventing the drying of the liquid discharge head 12. Thus, the drying of the liquid discharge head 12, which can cause malfunction in discharge, can be prevented.

The capping operation is preferably performed with both the valve 22 and the air release valve 30 closed. In this case, the moistened condition inside the cap 21 is maintained more easily.

The operation described in section (5) above is illustrated in FIG. 2C. Capping is performed with both the valve 22 and the air release valve 30 closed and the cap 21 contacting the nozzle face of the liquid discharge head 12.

The above-described operations can be controlled by a controller, for example.

Figure 3:
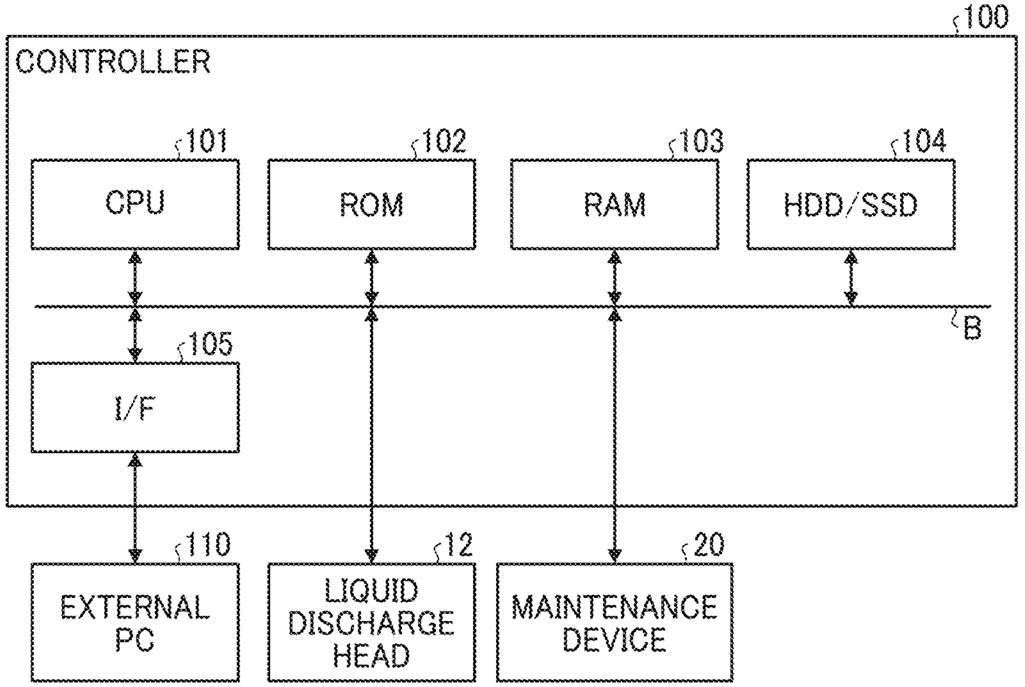
FIG. 3 is a block diagram of a hardware configuration of a controller according to an embodiment of the present disclosure.
Figure 3:
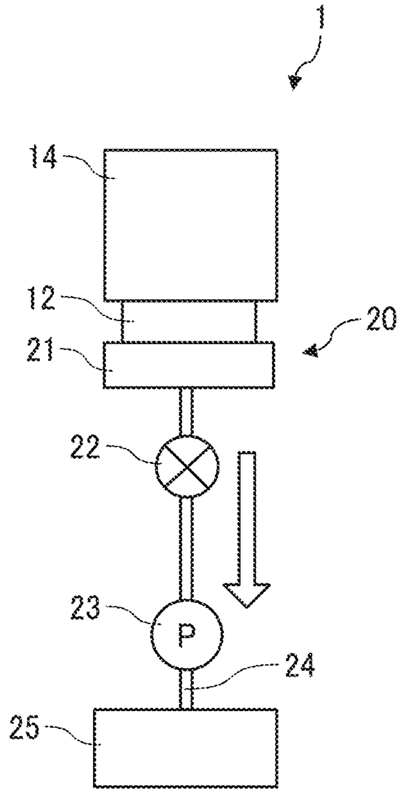

FIG. 3 is a block diagram of the hardware configuration of a controller 100 according to an embodiment of the present disclosure. The controller 100 includes a central processing unit (CPU) 101, a read only memory (ROM) 102, a random access memory (RAM) 103, a hard disk drive (HDD)/solid state drive (SSD) 104, and an interface (I/F) 105.

These components are electrically connected via a system bus B, allowing data and signals to be transmitted and received therebetween. The connection includes the liquid discharge head 12 and the maintenance device 20.

Although the liquid discharge head 12 is illustrated in the drawing, a liquid discharge unit including the liquid discharge head 12 may be used. The controller 100 is also illustrated in FIG. 1.

The CPU 101 uses the RAM 103 as a work area and executes a program stored in the ROM 102. The HDD/SSD 104 is used as storage and stores preset setting values. The CPU 101 may read information stored in the HDD/SSD 104 and use the information to execute a program. The OF 105 enables communication, for example, between the printer 1 and an external personal computer (PC) 110.

The controller 100 controls, for example, the liquid discharge head 12 and the maintenance device 20. For the control of the maintenance device 20, the controller 100 controls, for example, the cap 21, the valve 22, the suction pump 23, and the air release valve 30. For example, the controller 100 controls the cap 21 to be brought into contact with and separate from the nozzle face of the liquid discharge head 12. The controller also controls the opening and closing of the valve 22, the drive and stopping of the suction pump 23, and the opening and closing of the air release valve 30.

As described above, preferably, the printer according to an embodiment of the present disclosure includes a liquid storage tank 27 (a liquid storage), an air release valve 30 (an air release portion), and a controller 100. With this configuration, the operations described in sections (1) to (5) above can be easily performed. The liquid storage tank 27 includes a waste liquid tank 25 and a cleaning liquid tank 26. In the liquid storage tank 27, the waste liquid channel 24 is connected to the cleaning liquid feed channel 29.

The air release valve 30 is included in the liquid storage tank 27. The air release valve 30 opens and closes the communication between the liquid storage tank 27 and the atmosphere outside the maintenance device 20. The control of the controller 100 is described below according to an embodiment of the present disclosure.

The controller 100 controls the suction pump 23 to perform suction with the air release valve 30 opened, enabling the suction of the liquid remaining in the cap 21 without supplying the cleaning liquid to the cap 21. This also corresponds to the operation as described in section (3) above.

The controller 100 controls the suction pump 23 to perform suction with the air release valve 30 closed and the cap 21 separated from the nozzle face, enabling the cap 21 to be filled with the cleaning liquid. This also corresponds to the operation as described in section (4) above.

The controller 100 controls the opening and closing of the valve 22, and by closing the valve 22, retains the cleaning liquid supplied to the cap 21 within the cap 21. This enables the capping with a moist cap 21, as described in section (5) above.

Aspects of the present invention are as follows, for example.

Aspect 1

A maintenance device includes: a cap to contact a nozzle face of a liquid discharge head; a suction device to suck liquid from the cap; a waste liquid storage to which the liquid sucked from the cap is discharged; a waste liquid channel connecting the cap and the waste liquid storage; a cleaning liquid storage accommodating a cleaning liquid, the cleaning liquid storage communicating with the waste liquid storage to allow gases inside the cleaning liquid storage and the waste liquid storage to flow therebetween; a cleaning liquid feed channel connecting the cap and the cleaning liquid storage; and a partition separating the liquid in the waste liquid storage from the cleaning liquid in the cleaning liquid storage to prevent the liquid in the waste liquid storage from mixing with the cleaning liquid in the cleaning liquid storage. The cleaning liquid is supplied from the cleaning liquid storage to the cap through the cleaning liquid feed channel by increased pressures within the waste liquid storage and the cleaning liquid storage in response to suction of the suction device.

Aspect 2

The maintenance device according to Aspect 1, further includes a liquid storage connecting the waste liquid channel and the cleaning liquid feed channel. The liquid storage includes the waste liquid storage; the cleaning liquid storage; and an air release portion to open and close communication between the liquid storage and atmosphere outside the maintenance device.

Aspect 3

A printer includes: the maintenance device according to Aspect 1; and the liquid discharge head to discharge liquid to a recording medium.

Aspect 4

The printer according to Aspect 3, further includes: a liquid storage connecting the waste liquid channel and the cleaning liquid feed channel; and circuitry. The liquid storage includes: the waste liquid storage; the cleaning liquid storage; and an air release portion to open and close communication between the liquid storage and atmosphere outside the maintenance device. The circuitry causes the cap to selectively contact with the nozzle face and separate from the nozzle face; causes the suction device to suck liquid from the cap; and opens and closes the air release portion.

Aspect 5

In the printer according to Aspect 4, the circuitry is further configured to: open the air release portion; and cause the suction device to suck liquid from the cap, with the air release portion opened, to allow a liquid remaining in the cap to be sucked from the cap without supplying the cleaning liquid to the cap.

Aspect 6

In the printer according to Aspect 4 or 5, the circuitry is further configured to: close the air release portion; cause the cap to separate from the nozzle face; and cause the suction device to suck liquid from the cap, with the air release portion closed and with the cap separated from the nozzle face, to allow the cap to be filled with the cleaning liquid.

Aspect 7

In the printer according to any one of Aspect to Aspect 6, the waste liquid channel includes a valve to open and close communication between the cap and the waste liquid storage. The circuitry is further configured to close the valve to allow the cleaning liquid supplied to the cap to remain in the cap.

Aspect 8

A maintenance device includes: a cap detachably contactable with a nozzle face of a liquid discharge head; a suction device to suck liquid from the cap; a waste liquid storage to store the liquid sucked from the cap by the suction device; a waste liquid channel connecting the cap and the waste liquid storage; a cleaning liquid storage storing a cleaning liquid to be supplied to the cap; and a cleaning liquid channel connecting the cap and the cleaning liquid storage. The suction device sucks: the waste liquid in the cap to discharge the waste liquid to the waste liquid storage through the waste liquid channel; and the cleaning liquid in the cleaning liquid storage to supply the cleaning liquid to the cap through the cleaning liquid channel.

Aspect 9

The maintenance device according to Aspect 8, further includes: a partition between the waste liquid storage and the cleaning liquid storage, the partition separating the liquid in the waste liquid storage from the cleaning liquid in the cleaning liquid storage; and a communication channel above the partition through which gases flows between the cleaning liquid storage and the waste liquid storage.

Aspect 10

The maintenance device according to Aspect 8, further includes a liquid storage including the waste liquid storage and the cleaning liquid storage. The liquid storage includes an air release portion to openably close the liquid storage to atmosphere.

Aspect 11

A printer includes: the maintenance device according to Aspect 8; and the liquid discharge head to discharge a liquid to a recording medium.

Aspect 12

The printer according to Aspect 11, further includes: a liquid storage including the waste liquid storage and the cleaning liquid storage, the liquid storage including an air release portion to openably close the liquid storage to atmosphere; and circuitry configured to: cause the cap to selectively contact with the nozzle face and separate from the nozzle face; cause the suction device to suck the waste liquid from the cap; and selectively open and close the air release portion.

Aspect 13

In the printer according to Aspect 12, the circuitry opens the air release portion; and causes the suction device to suck the waste liquid from the cap without supplying the cleaning liquid to the cap.

Aspect 14

In the printer according to Aspect 12, the circuitry closes the air release portion; causes the cap to separate from the nozzle face; and causes the suction device to suck the cleaning liquid from the cap to fill the cap with the cleaning liquid.

Aspect 15

In the printer according to Aspect 12, the waste liquid channel includes a valve to open and close the waste liquid channel, and the circuitry closes the valve to keep the cleaning liquid in the cap.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), a digital signal processor (DSP), a field programmable gate array (FPGA), and conventional circuit components arranged to perform the recited functions.

The invention claimed is:

1. A maintenance device comprising:

a cap configured to detachably contact a nozzle face of a liquid discharge head;

a suction device configured to suck waste liquid from the cap;

a waste liquid storage configured to store the waste liquid sucked from the cap by the suction device;

a waste liquid channel connecting the cap and the waste liquid storage;

a cleaning liquid storage configured to store a cleaning liquid to be supplied to the cap;

a cleaning liquid channel connecting the cap and the cleaning liquid storage;

a partition between the waste liquid storage and the cleaning liquid storage, the partition separating the waste liquid in the waste liquid storage from the cleaning liquid in the cleaning liquid storage; and a communication channel above the partition, the communication channel configured such that gases flow between the cleaning liquid storage and the waste liquid storage via the communication channel, wherein the suction device is configured to suck:

the waste liquid in the cap to discharge the waste liquid to the waste liquid storage through the waste liquid channel; and the cleaning liquid in the cleaning liquid storage to supply the cleaning liquid to the cap through the cleaning liquid channel.

2. The maintenance device according to claim 1, further comprising a liquid storage including the waste liquid storage and the cleaning liquid storage, wherein the liquid storage includes an air release portion configured to openably close the liquid storage to atmosphere.

3. A printer comprising:

the maintenance device according to claim 1; and the liquid discharge head configured to discharge a liquid to a recording medium.

4. The printer according to claim 3, further comprising:

a liquid storage including the waste liquid storage and the cleaning liquid storage, the liquid storage including an air release portion configured to openably close the liquid storage to atmosphere; and circuitry configured to:

cause the cap to selectively contact with the nozzle face and separate from the nozzle face;

cause the suction device to suck the waste liquid from the cap; and selectively open and close the air release portion.

5. The printer according to claim 4, wherein the circuitry is further configured to:

open the air release portion; and cause the suction device to suck the waste liquid from the cap without supplying the cleaning liquid to the cap.

6. The printer according to claim 4, wherein the circuitry is further configured to:

close the air release portion;

cause the cap to separate from the nozzle face; and cause the suction device to suck the cleaning liquid from the cap to fill the cap with the cleaning liquid.

7. The printer according to claim 4, wherein the waste liquid channel includes a valve that is configured to open and close the waste liquid channel, and the circuitry is configured to close the valve to keep the cleaning liquid in the cap.

* * * * *